United States Patent
Liu et al.

(10) Patent No.: US 9,614,660 B2
(45) Date of Patent: Apr. 4, 2017

(54) SELF-SYNCHRONIZING PROBE SEQUENCE

(71) Applicant: Futurewei Technologies, Inc., Plano, TX (US)

(72) Inventors: Jianhua Liu, Shenzhen (CN); Amir H. Fazlollahi, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 81 days.

(21) Appl. No.: 14/132,207

(22) Filed: Dec. 18, 2013

(65) Prior Publication Data

US 2014/0328442 A1  Nov. 6, 2014

Related U.S. Application Data

(60) Provisional application No. 61/819,320, filed on May 3, 2013.

(51) Int. Cl.
*H04L 25/03* (2006.01)
*H04L 7/00* (2006.01)
*H04L 27/26* (2006.01)

(52) U.S. Cl.
CPC .......... *H04L 7/0091* (2013.01); *H04L 7/0079* (2013.01); *H04L 25/03159* (2013.01);
(Continued)

(58) Field of Classification Search
None
See application file for complete search history.

(56) References Cited

U.S. PATENT DOCUMENTS

2003/0103559 A1* 6/2003 Palm ............................ 375/222
2006/0083324 A1* 4/2006 DesJardins ........... H04L 1/0057
375/260
(Continued)

FOREIGN PATENT DOCUMENTS

CN  102388588 A  3/2012
EP  0963068 A2  12/1999
(Continued)

OTHER PUBLICATIONS

P. Vetter, T. Ayhan, K. Kanonakis, B. Lannoo, K.L. Lee, Lefevre, C. Monney, F. Saliou, X. Yin, GreenOpticalAccess, 2012, Green touch.*

(Continued)

*Primary Examiner* — Noel Beharry
*Assistant Examiner* — Wilfred Thomas
(74) *Attorney, Agent, or Firm* — Conley Rose, P.C.

(57) ABSTRACT

A method comprising modulating a plurality of synchronized signals by an orthogonal probe sequence (OPS) to generate a plurality of modulated synchronized signals, wherein the OPS comprises a zero element (0-element) column that indicates a start or an end of the OPS, and concurrently transmitting, using one or more transmitters, the plurality of modulated synchronized signals over a duration of a number of discrete multi-tone (DMT) symbols, wherein each of the plurality of modulated synchronized signals is intended for one of a plurality of receivers that are remotely coupled to the one or more transmitters via a vectored group of subscriber lines, and wherein the 0-element column causes all of the plurality of modulated synchronized signals to have a zero-amplitude during a first or a last of the DMT symbols.

24 Claims, 8 Drawing Sheets

(52) U.S. Cl.
CPC ...... *H04L 27/2613* (2013.01); *H04L 27/2656* (2013.01); *H04L 27/2675* (2013.01); *H04L 2025/03414* (2013.01); *H04L 2025/03636* (2013.01)

(56) References Cited

U.S. PATENT DOCUMENTS

| | | | |
|---|---|---|---|
| 2008/0260011 A1* | 10/2008 | Peeters | H04L 1/0025 375/222 |
| 2009/0245340 A1 | 10/2009 | Sorbara et al. | |
| 2009/0270038 A1* | 10/2009 | Clausen | 455/63.1 |
| 2010/0034249 A1* | 2/2010 | Schenk | H04B 3/487 375/227 |
| 2010/0135316 A1* | 6/2010 | Atungsiri et al. | 370/436 |
| 2010/0303136 A1 | 12/2010 | Ashikhmin et al. | |
| 2011/0044159 A1 | 2/2011 | Kishiyama et al. | |
| 2011/0110402 A1* | 5/2011 | Schenk | H04L 1/12 375/219 |
| 2013/0230324 A1* | 9/2013 | Gupta | 398/66 |
| 2014/0064339 A1* | 3/2014 | Kim et al. | 375/219 |
| 2014/0169327 A1 | 6/2014 | Chun et al. | |

FOREIGN PATENT DOCUMENTS

| | | |
|---|---|---|
| EP | 1953940 A1 | 8/2008 |
| RU | 106010 U1 | 6/2011 |
| WO | 0013324 A2 | 3/2000 |
| WO | 2009022695 A1 | 2/2009 |
| WO | 2010022221 A1 | 2/2010 |
| WO | 2011031831 A1 | 3/2011 |
| WO | 2013015646 A2 | 1/2013 |

OTHER PUBLICATIONS

"G.fast: Updates of the working text describing early stages of initialization", ITU Telecommunication Standardization Sector, Study Group 15, Teleconference Aug. 21, 2013, 2013-09-Q4-OXX, 22 pgs.

"Updated draft text for G.fast-version 7.1", ITU Telecommunication Standardization Sector, Study Group 15, Barcelona, Spain, Sep. 30-Oct. 4, 2013, 2013-09-Q4-R20R1, 129 pgs.

"Draft Recommendation G.9701 (for consent)", Study Group 15, WP1/15 Meeting, Geneva, Switzerland, Dec. 6, 2013, 288 pgs.

"Compromise proposal on early stages of initialization", Contributions C0199 and CO337, 2 pgs.

"G.fast: Initialization", International Telecommunication Union, ITU Teleeommunication Standardization Sector, Study Group 15, Contribution 0199 Rev. 1, Geneva, Switzerland, Jul. 1-12, 2013, COM 15-C 0199 Rev. 1-E, 4 pgs.

"Series G: Transmission Systems and Media, Digital Systems and Networks", "Digital sections and digital line system—Access networks", "Self-FEXT cancellation (vectoring) for use with VDSL2 transceivers", ITU-T Telecommunication Standardization Sector of ITU, G.993.5, Apr. 2010, 80 pgs.

Foreign Communication From a Counterpart Application, PCT Application No. PCT/CN2014/076088, International Search Report dated Jul. 30, 2014, 7 pages.

Foreign Communication From a Counterpart Application, PCT Application No. PCT/CN2014/076088, Written Opinion dated Jul. 30, 2014, 5 pages.

"Part 3: Carrier Sense Multiple Access with Collision Detection (CSMA/CD) Access Method and Physical Layer Specifications, Amendment 1: Physical Layer Specifications and Management Parameters for 10 Gb/s Passive Optical Networks," IEEE Computer Society, 802.3av, Oct. 30, 2009, 236 pages.

"Part 3: Carrier Sense Multiple Access with Collision Detection (CSMA/CD) Access Method and Physical Layer Specifications, Section Five: This section includes Clause 56 through Clause 67 and Annex 58A through Annex 67A," IEEE Std 802.3, 2005, 417 pages.

"EPON Protocol over Coax (EPoC): with RTT-Aware Dynamic Bandwidth Allocation (DBA)," Apr. 16, 2013, 6 pages.

"DOCSIS EoC for EPON in China," Oct. 2010, 14 pages.

"Operating the EPON Protocol Over Coaxial Distribution Networks Call for Interest," IEEE 802.3 Ethernet Working Group, Nov. 8, 2011, Atlanta, Georgia, 38 pages.

"HomePNA Modem for MDU Endpoints," CG3310M, Sigma Designs, May 21, 2012, 2 pages.

Foreign Communication From a Counterpart Application, European Application No. 14792363.5, Extended European Search Report dated Jun. 16, 2016, 8 pages.

Foreign Communication From a Counterpart Application, Russian Application No. 2015151804, Russian Office Action dated Apr. 24, 2014, 9 pages.

\* cited by examiner $$W = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

FIG. 4A $$W = \begin{bmatrix} 1 & 1 & 1 & 1 & 1 & 1 & 1 & 1 & \cdots & 1 \\ 1 & -1 & 1 & -1 & 1 & -1 & 1 & -1 & \cdots & -1 \\ 1 & 1 & -1 & -1 & 1 & 1 & -1 & -1 & \cdots & -1 \\ 1 & -1 & -1 & 1 & 1 & -1 & -1 & 1 & \cdots & 1 \end{bmatrix}$$

FIG. 4B $$W = \begin{bmatrix} 0 & 1 & 1 & 1 & 1 \\ 0 & 1 & -1 & 1 & -1 \\ 0 & 1 & 1 & -1 & -1 \\ 0 & 1 & -1 & -1 & 1 \end{bmatrix}$$

FIG. 4C $$W = \begin{bmatrix} 1 & 1 & 1 & 0 \\ 1 & -1 & 1 & 0 \\ 1 & 1 & -1 & 0 \\ 1 & -1 & -1 & 0 \end{bmatrix}$$

FIG. 4D $$W = \begin{bmatrix} 1 & 1 & 1 & 1 & 0 & 1 & 1 & 1 & 1 & 0 & \cdots \\ 1 & -1 & 1 & -1 & 0 & 1 & -1 & 1 & -1 & 0 & \cdots \\ 1 & 1 & -1 & -1 & 0 & 1 & 1 & -1 & -1 & 0 & \cdots \\ 1 & -1 & -1 & 1 & 0 & 1 & -1 & -1 & 1 & 0 & \cdots \end{bmatrix}$$

FIG. 4E $$W = \begin{bmatrix} 0 & 1 & 1 & 1 & 1 & \cdots & 1 & 1 & 1 & 0 \\ 0 & 1 & -1 & 1 & -1 & \cdots & 1 & -1 & 1 & 0 \\ 0 & 1 & 1 & -1 & -1 & \cdots & 1 & 1 & -1 & 0 \\ 0 & 1 & -1 & -1 & 1 & \cdots & 1 & -1 & -1 & 0 \end{bmatrix}$$

N OPS periods

FIG. 4F

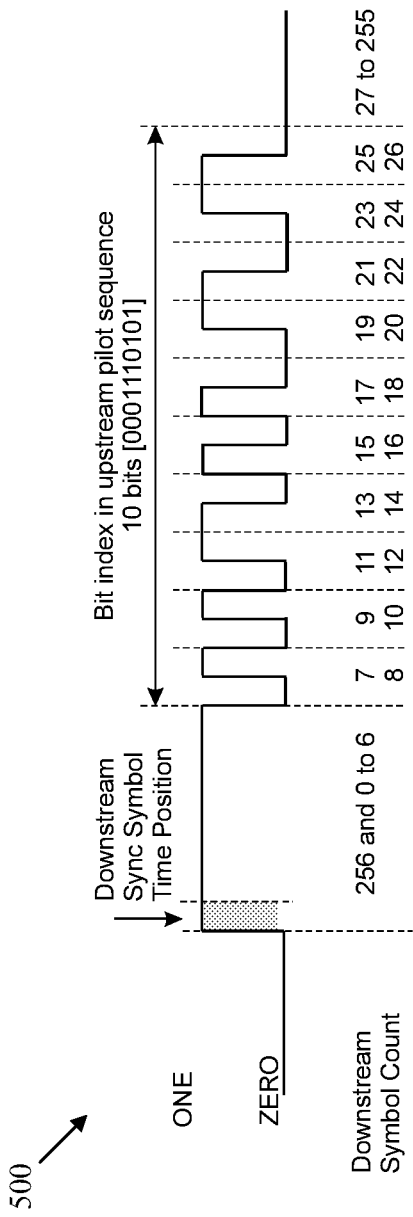
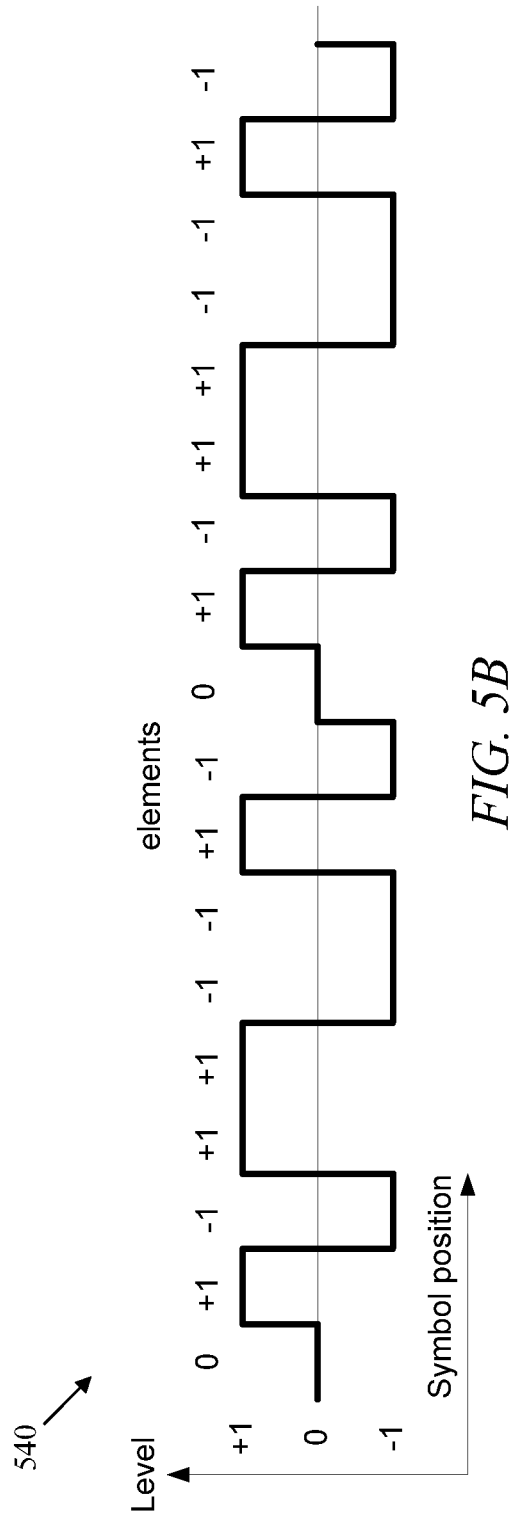

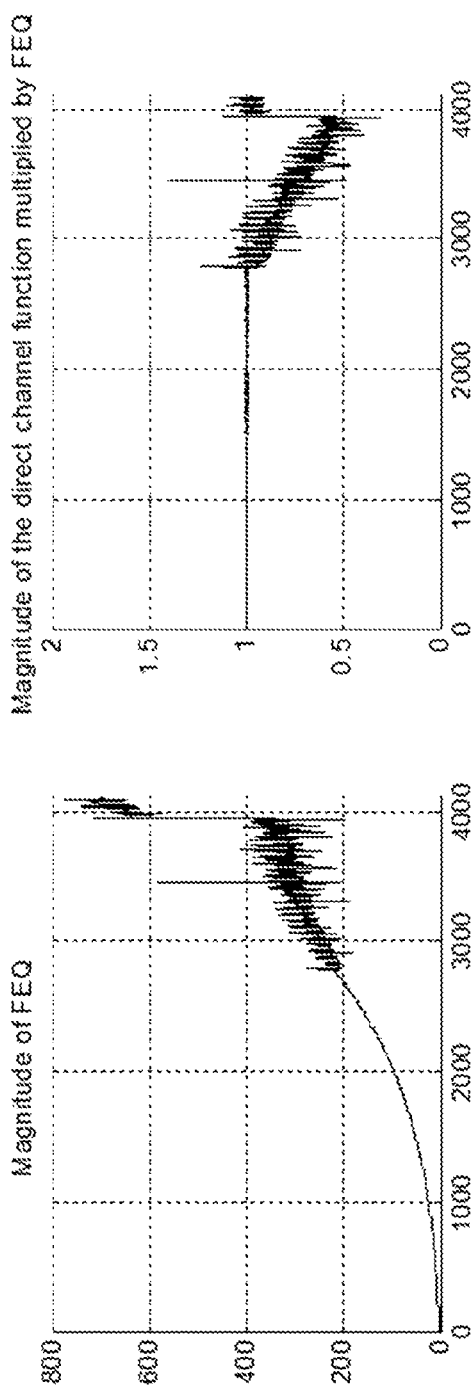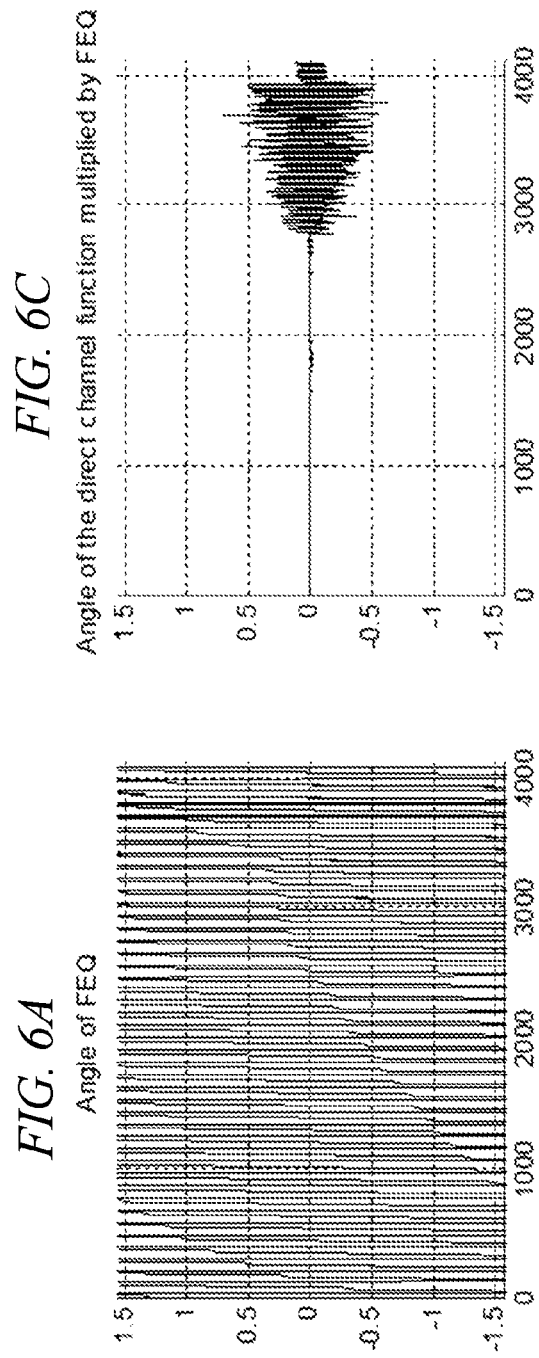
FIG. 6A
FIG. 6B
FIG. 6C
FIG. 6D

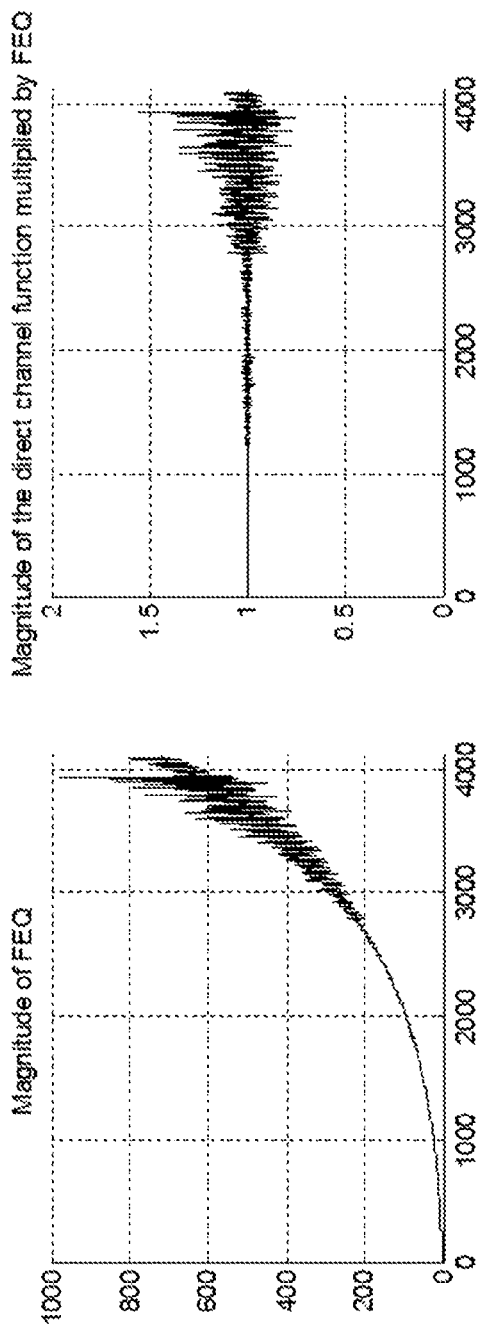
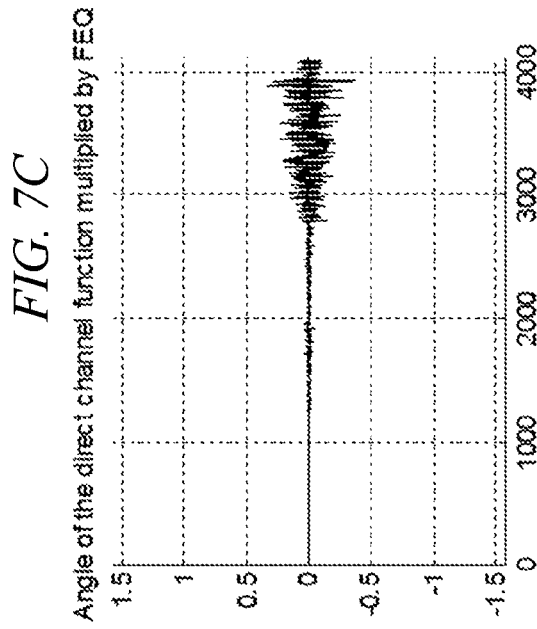
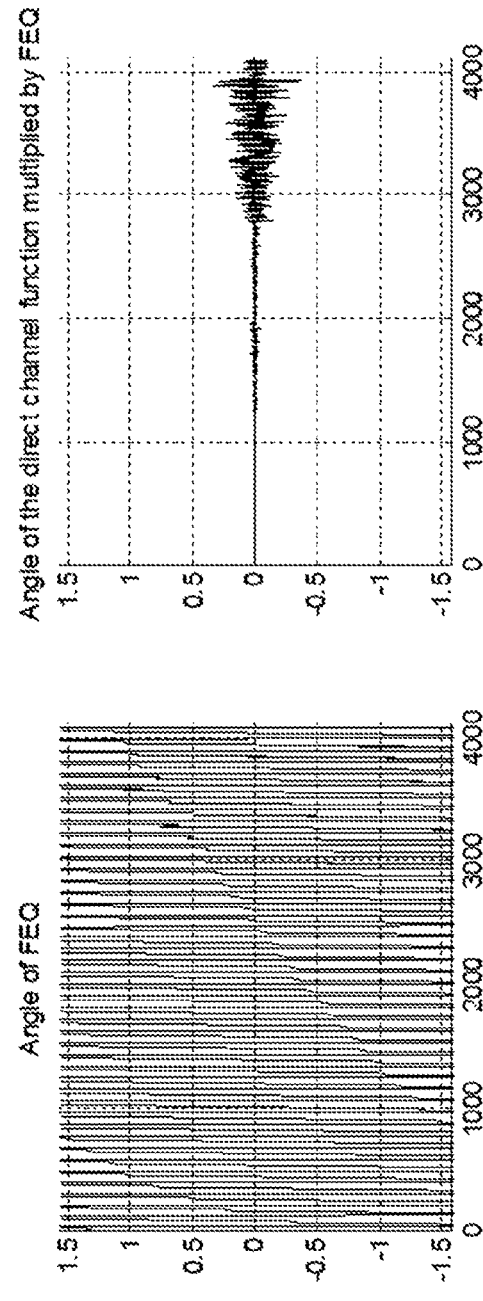
FIG. 7A
FIG. 7B
FIG. 7C
FIG. 7D

SELF-SYNCHRONIZING PROBE SEQUENCE

CROSS-REFERENCE TO RELATED APPLICATIONS

The present application claims priority to U.S. Provisional Patent Application No. 61/819,320 filed May 3, 2013 by Jianhua Liu et al. and entitled "A Self-Synchronizing Probe Sequence", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Digital subscriber line (DSL) technologies provide a large bandwidth for digital communications over existing subscriber lines (e.g., copper pairs). When transmitting data over the subscriber lines, crosstalk interference can occur between the transmitted signals over adjacent lines, for example in a same or nearby bundle of lines. Crosstalk, including near end crosstalk (NEXT) and far end crosstalk (FEXT), may limit the performance of various DSL systems, such as those defined by existing standards including asymmetric DSL 2 (ADSL2), very high speed DSL (VDSL), very high speed DSL 2 (VDSL2), as well as G.fast which is a future standard to be issued by the International Telecommunication Union Telecommunication Standardization Sector (ITU-T) Study Group 15 (SG15).

In vectored DSL systems, an orthogonal probe sequence (sometimes also referred to as a pilot sequence) is used to estimate channel matrix. Take a VDSL2 system as an example: in order for an initializing VDSL2 transceiver unit on a remote side (VTU-R) modem to join in at the right bit index of an upstream probe sequence, the upstream probe sequence and its bit index may need to be transmitted from a VDSL2 transceiver unit on an operator side (VTU-O). Details regarding how an upstream probe sequence marker is transmitted from the VTU-O to the VTU-R can be found in the ITU-T G.993.5 Recommendation Section 10.3.3.5 headlined "Downstream Sync symbol and upstream pilot sequence markers", which is incorporated herein by reference.

According to G.993.5 that defines vectoring protocols for FEXT cancellation in VDSL2 modems, per-tone frequency domain equalizers (FEQs) of a discrete multi-tone (DMT) demodulator may be primarily trained. In other vectored DSL systems such as G.fast, a used frequency band may be much higher and FEXT may be much stronger. Consequently, FEQ training using traditional methods, including least mean square (LMS), blind LMS (BLMS), and averaging, may work less effectively (e.g., convergence may take a long time).

SUMMARY

In one embodiment, the disclosure includes a method comprising modulating a plurality of synchronized signals by an orthogonal probe sequence (OPS) to generate a plurality of modulated synchronized signals, wherein the OPS comprises a zero element (0-element) that indicates a start or an end of the OPS, and concurrently transmitting, using one or more transmitters, the plurality of modulated synchronized signals over a duration of a number of discrete multi-tone (DMT) symbols, wherein each of the plurality of modulated synchronized signals is intended for one of a plurality of receivers that are remotely coupled to the one or more transmitters via a vectored group of subscriber lines, and wherein the 0-element causes all of the plurality of modulated synchronized signals to have a zero-amplitude during a first or a last of the DMT symbols.

In another embodiment, the disclosure includes an apparatus comprising a processor configured to modulate a plurality of synchronized signals using an OPS to generate a plurality of modulated synchronized signals, wherein each of the plurality of modulated synchronized signals comprises a number of DMT symbols, and one or more transmitters coupled to the processor and configured to concurrently transmit the plurality of modulated synchronized signals over a number of time periods corresponding to the DMT symbols, wherein each of the plurality of modulated synchronized signals is intended for one of a plurality of receivers that are remotely coupled to the one or more transmitters via a vectored group of subscriber lines, and wherein all of the plurality of modulated synchronized signals have a zero-amplitude in a first or last time period of the time periods.

In yet another embodiment, the disclosure includes an apparatus comprising a receiver configured to receive a signal over a plurality of time periods from a transmitter, wherein each of the plurality of time periods corresponds to a duration of a DMT symbol, wherein each DMT symbol has been modulated by an element of a probe sequence, wherein the probe sequence is orthogonal to other probe sequences of other transmitters in a plurality of synchronized transmitters, and a processor coupled to the receiver and configured to detect a time period in which the received signal has a zero-amplitude in all signal channels, synchronize a zero level (0-element) to the time period such that the 0-element marks a start of a reference probe sequence, known by the processor, and extract a direct channel from the received signal over a number of time periods immediately following the 0-element using the reference probe sequence.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 4A and 4B illustrate examples of traditional orthogonal probe sequence (OPS) matrices.

FIGS. 4C-4F illustrate example embodiments of OPS matrices disclosed herein.

FIG. 5A is a schematic diagram illustrating a symbol modulation pattern indicating bit-index of upstream probe sequence from VTU-O to VTU-R used in G.993.5.

FIG. 5B is a schematic diagram illustrating an example embodiment of a symbol modulation pattern that may be used by G.fast.

FIGS. 6A-6D are diagrams illustrating simulation results obtained by training a frequency domain equalizer (FEQ) using a least mean square (LMS) algorithm.

FIGS. 7A-7D are diagrams illustrating simulation results obtained by training the FEQ using a disclosed code division multiple access (CDMA)-like algorithm.

DETAILED DESCRIPTION

Figure 1:
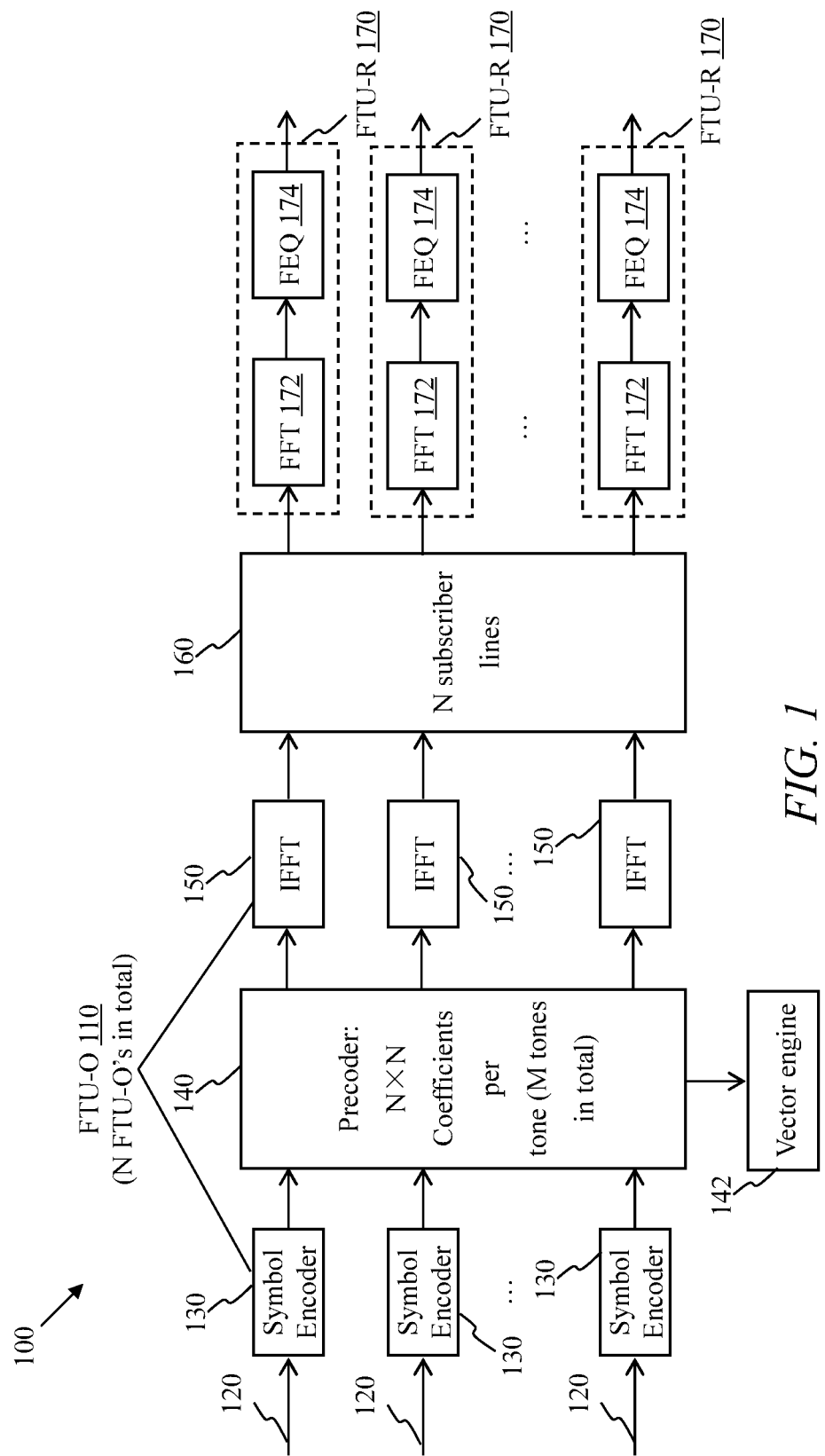
FIG. 1 is a schematic diagram illustrating an embodiment of a downstream section of a digital subscriber line (DSL) system.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Depending on the supported standard, a digital subscriber line (DSL) system may sometimes be denoted as an xDSL system, where 'x' may indicate any DSL standard. For instance, 'x' stands for 'A' in asymmetric DSL 2 (ADSL2) or ADSL2+ systems, and 'V' in very high speed DSL (VDSL) or VDSL2 systems. When a transceiver is located in at an operator end of the DSL system, such as a central office (CO), DSL access multiplexer (DSLAM), cabinet, or distribution point unit (DPU), the transceiver may be referred to as an xTU-O. On the other hand, when a transceiver is located at a remote or user end such as a customer premise equipment (CPE), the transceiver may be referred to as an xTU-R. Take a G.fast system as an example: a transceiver at an operator side may be referred to as a G.fast transceiver unit at an operator side (FTU-O), and a CPE transceiver may be referred to as an FTU at a remote terminal (FTU-R), i.e., at a subscriber side.

In G.fast, employing DMT modulation, a direct channel may need to be estimated and inverted for each subcarrier of the DMT to derive FEQ coefficients using a set of orthogonal probe sequences, similar to how FEXT channel is estimated in G.993.5. Each channel (port) may use a probe sequence that has the same length as the probe sequence of other channels (ports) but orthogonal to each one of them. Each probe sequence may be considered a row vector. A matrix comprising probe sequence of each port as its each row constitutes an orthogonal probe sequence matrix, which may be referred to as an OPS for brevity. The probe sequences of an OPS used in a vectored system may all start at the same time; i.e., the first column of the OPS is transmitted across the ports concurrently. In VDSL2-based G.993.5 where the FEXT level compared to the direct channel may be small, direct channel is estimated with FEXT present. Then FEQ is computed and used to estimate FEXT channels. When estimating a downstream (DS) FEXT channel in G.993.5, a VTU-R does not need to have the knowledge of a DS OPS or its bit index, as the VTU-R may simply report recorded error back to a corresponding VTU-O. The error signal received by each FTU-O is further processed by a vector engine to estimate the DS FEXT channel to be used in DS precoder that cancels FEXT. However, unlike G.993.5, an FTU-R in G.fast needs to know the bit index of a DS OPS to perform DS direct channel estimation. Downstream FEXT channel estimation can be performed similar to G.993.5.

Disclosed herein are systems, methods, apparatuses, and computer program products for self-synchronization of an initializing xTU-R to a DS probe sequence, e.g., even in the presence of strong FEXT. Using orthogonal probe sequences in the DS of each xTU-O, the DS direct channels may be estimated at the corresponding xTU-R while the FEXT channels are removed. The synchronization is achieved using zero elements (0-elements) in probe sequences synchronously transmitted by each xTU-O. Specifically, when an OPS is used in a transmitting side to modulate synchronized signals, a 0-element (sometimes interchangeably referred to herein as Z-state, or Z-bit) may be introduced into the OPS to mark a start or an end of the OPS. A DMT symbol multiplied by the 0-element may be forced to zero. Thus, the 0-element may cause modulated synchronized signals, which are transmitted by the transmitting side, to have a zero-amplitude across all ports during a first or a last DMT symbol. Because the transmitting side of active and joining lines may use the 0-element in the first or last DMT symbol, there may not be any signal amplitude or any FEXT in a vectored group of lines. Therefore, detection of the first or last DMT symbol may be performed without a need for FEQ. To reduce overhead, the 0-element may be incorporated into every N (any integer greater than one) OPS periods instead of every OPS period, or may only be used when a new line joins a vectored group of lines. By creating a 0-element in the OPS and using it synchronously across xTU-O's, self-synchronizing can be achieved by an xTU-R without the need to first transmit the bit-index of the OPS from a corresponding xTU-O.

FIG. 1 is a schematic diagram illustrating an embodiment of a DS section 100 of a DSL system. Suppose the DSL system complies with the G.fast standard, but one of ordinary skill in the art will recognize that mechanisms disclosed herein may similarly apply to any other DSL system. In the DS section or configuration 100, N FTU-O's 110 may receive precoded DS signals from N subscriber lines 120, process the signals, and transmit the processed DS signals onto N subscriber lines 160, where N is an integer greater than one. The N subscriber lines 160 may be considered a vectored group of lines, since their signals may be jointly processed by a vector engine 142 located at a distribution point where the FTU-O's 110 are located, to cancel DS FEXT using a precoding technique. Each FTU-O 110 may comprise a symbol encoder 130 and an inverse fast Fourier transform (IFFT) block 150. Thus, an incoming bit stream in a line 120, carrying data from a network source in the downstream, may be encoded by its corresponding symbol encoder 130. The symbol encoder 130 may divide the incoming bit stream into small groups of bits, wherein each group may be assigned to be modulated onto a subcarrier of a digital multi-tone (DMT) symbol. A number of subcarriers in each line may be denoted herein as M, where M is an integer.

Encoded symbols in the group of lines may feed into a precoder 140, which is configured to linearly combine signals from each line and produce signals to feed inverse fast Fourier transform (IFFT) blocks 150. The precoder 140 may be controlled by the vector engine 142 and may compute multiple outputs from multiple inputs, thus the precoder 140 is a multiple inputs multiple outputs (MIMO) system in the frequency domain. Since multiple tones may be used, the precoder 140 may have a distinct matrix of coefficient for each tone. In the DS direction, a channel matrix may be extracted for each DS tone from a backchannel between an FTU-O 110 and an FTU-R 170. The channel matrix may be used in the precoder 140 to cancel or mitigate FEXT in the DS. Specifically, a pre-distortion filter or a precoding matrix may be used to pre-distort signals, and thus reduce or eliminate FEXT that occurs among the subscriber lines 160, thereby allowing each DS receiver at FTU-R's 170 to achieve a higher data rate.

Each IFFT block 150 may be used for DMT modulation, which converts M symbols in the frequency domain to M signals in the time domain. The time domain signals are transmitted onto the N egressing subscriber lines 160, which may be considered a vectored group of lines, and their signals are generated by the plurality of FTU-O's 110 and intended for a plurality of FTU-R's 170. Crosstalks including NEXT and/or FEXT may be introduced when signals travel in the subscriber lines 160. Each DS receiver may have a corresponding subscriber line or copper pair that connects the DS receiver to an FTU-O 110. The subscriber lines 160 may be bundled together in a cable bundle or binder.

As understood by a person of ordinary skill in the art, each DS receiver at a customer premises, i.e., at each FTU-R 170 may be configured to receive a corresponding signal from one of the subscriber lines 160. Further, each FTU-R 170 may comprise a fast Fourier transform (FFT) block 172 and an FEQ 174. The FFT block 172 may be used for DMT demodulation, which converts signals in the time domain to symbols in the frequency domain. The FEQ 174 may be used to compensate for signal distortions caused by the direct channel loss of a subscriber line.

In the downstream section 100, the FTU-O 110 may use an OPS comprising a 0-element across the subscriber lines 160 to synchronize a joining line (can be any of the N lines) to the OPS. The N FTU-O's 110 may modulate a plurality of synchronized signals by the OPS comprising the 0-element to generate a plurality of modulated synchronized signals, and the plurality of modulated synchronized signals may be concurrently transmitted across ports of the N FTU-O's 110 to the N FTU-R's 170 over the duration of DMT symbols.

The 0-element may also be used to perform additional functions, e.g., estimate FEXT, estimate a direct channel, and derive FEQ coefficients. For example, in an early stage of training where coefficients of the adaptive FEQ 174 may have not been trained yet, after the joining line is synchronize to the probe sequence, disclosed embodiments may enable a joining line to perform fast FEQ training even in the presence of strong FEXT.

In G.993.5, synchronization may only be achieved in a later stage after FEQ coefficients have been trained, and FEQ training using traditional LMS may not work well when strong FEXT is present. With poor FEQ training, vectoring performance which is designed for cancelling FEXT may also be poor as a consequence. On the other hand, disclosed FEQ training may employ a code division multiple access (CDMA)-like approach using OPS, which is superior to LMS or other traditional algorithms in terms of accuracy and convergence speed. As more advanced DSL systems such as G.fast may sometimes have relatively strong FEXT, disclosed FEQ training may prove to be more effective.

Figure 2:
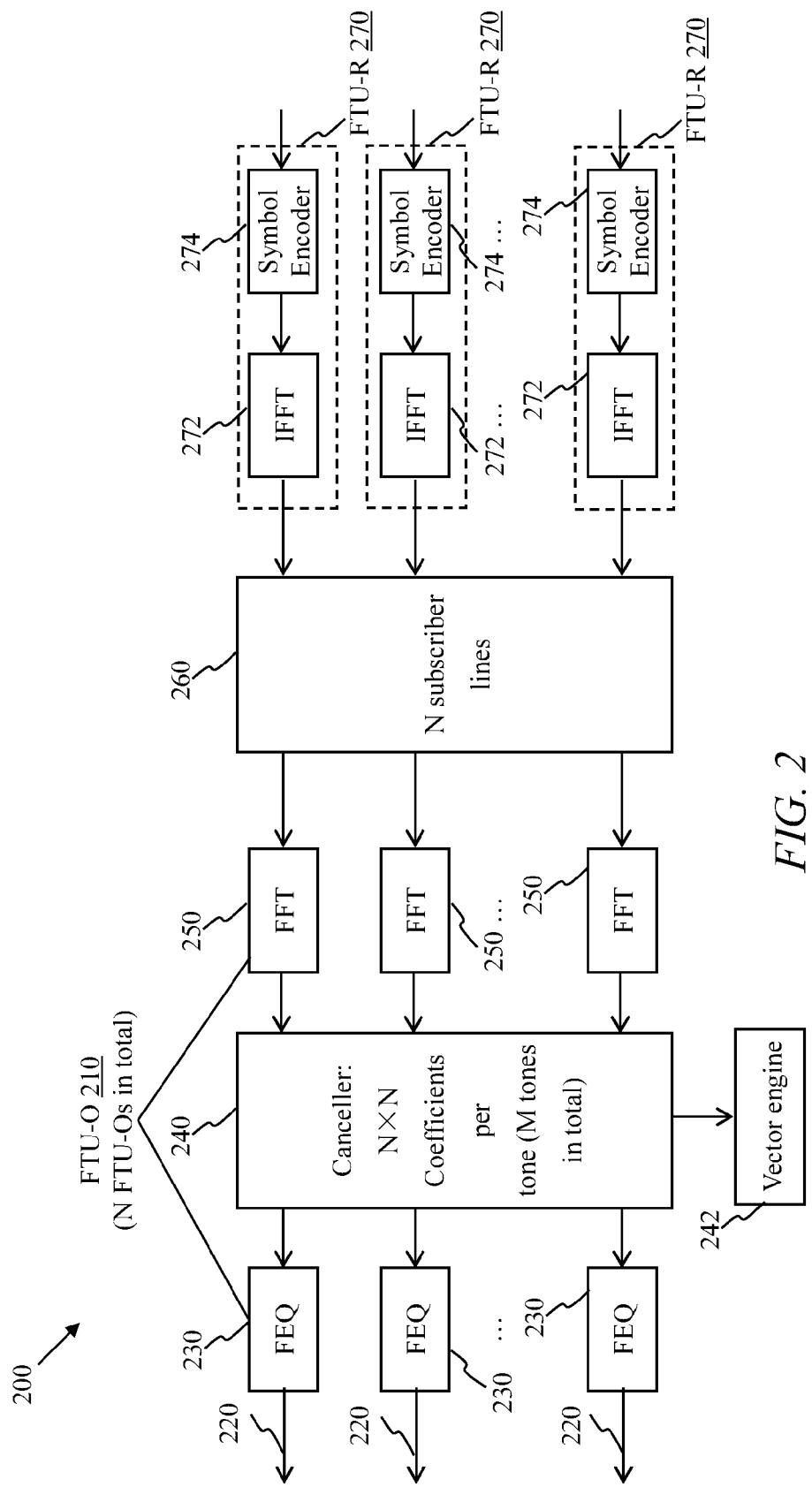
FIG. 2 is a schematic diagram illustrating an embodiment of an upstream section of a DSL system.

FIG. 2 is a schematic diagram illustrating an embodiment of an US section 200 of a DSL system. The upstream section 200 may correspond to the DS section 100, thus some of the aspects are similar. In the interest of conciseness, further descriptions will focus on aspects that are different or yet to be covered. In the US section 200, N FTU-O's 210 may receive US signals from N ingress subscriber lines 260, demodulate the signal using FFT 250, and transmit the signal to FEXT canceller block 240, where N is an integer greater than one.

The US section 200 comprises a plurality of FTU-R's 270, each comprising an IFFT block or module 272 and a symbol encoder 274 for each subscriber line 260. Thus, an incoming bit stream carrying US data may be encoded by a corresponding symbol encoder 274. The symbol encoder 274 may divide the incoming bit stream into small groups of bits, wherein each group may be assigned to be modulated onto a tone or subcarrier of a DMT symbol.

Each IFFT block 272 may be used for DMT modulation, which converts symbols in the frequency domain to signals in the time domain. The time domain signals are transmitted onto the N egress subscriber lines 260, which may be considered a vectored group of lines, since their signals are generated by the plurality of FTU-R's 270 and are synchronized through the FTU-O's 210 by the vector engine 242. Crosstalks including NEXT and/or FEXT may be introduced when US signals travel in the subscriber lines 260. Each US receiver may have a corresponding subscriber line or copper pair that connects the US receiver to one of the FTU-R's 270. The subscriber lines 260 may be bundled together in a cable bundle or binder.

The FFT blocks 250 may be used for DMT demodulation, which converts signals in the time domain to symbols in the frequency domain. Demodulated symbols may feed into a crosstalk canceller 240, which is configured to linearly combine signals from each line, cancel FEXT, and produce signals to feed FEQ blocks 230. The canceller 240 is also a MIMO system in the frequency domain. Since multiple tones may be used, the canceller 240 may have a distinct matrix of canceller coefficients for each tone. In the US direction, a channel matrix may be extracted for each US tone. The channel matrix may be used in the canceller 240 to cancel or mitigate FEXT in the US. The FEQs 230 may be used to compensate for signal distortions caused by the direct channel loss (e.g., insertion loss) of subscriber lines 260. Similar to the DS section 100, in the US section 200, each FTU-R 270 may use a reference probe sequence comprising a 0-element for synchronization.

Figure 3:
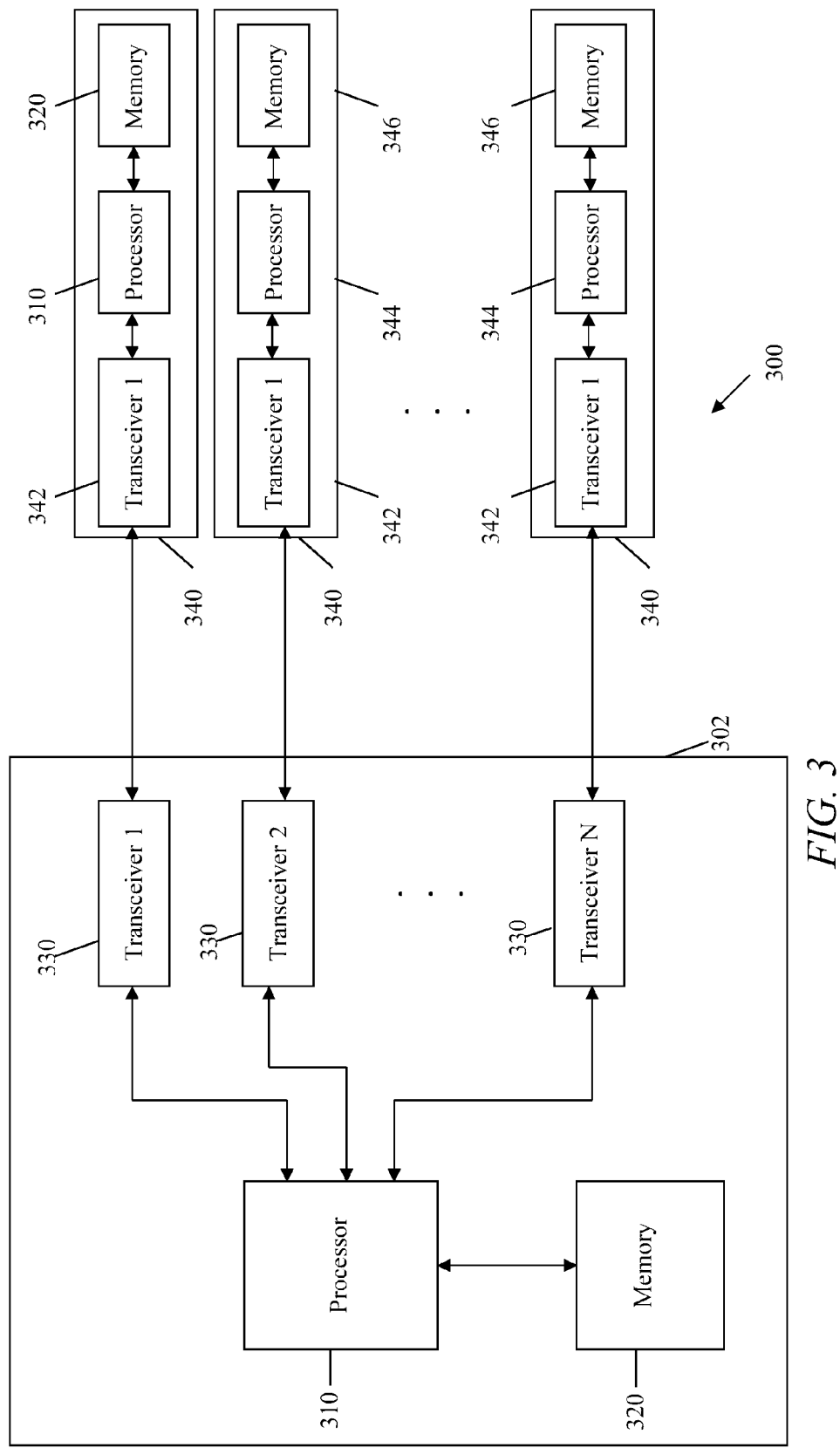
FIG. 3 is another schematic diagram illustrating an embodiment of a DSL system.

FIG. 3 is a schematic diagram illustrating an embodiment of a DSL system 300, which may be configured to implement the downstream section 100, the upstream section 200, and other embodiments disclosed herein. The DSL system 300 comprises a distribution point unit (DPU) 302 and a plurality of CPEs 330 remotely coupled to the DPU 302 via a vectored group of subscriber lines. For downstream synchronization, an FTU-O located at DPU 302 is considered a transmitting side, and each CPE 340 is considered a receiving side. For upstream synchronization, the FTU-O is considered a receiving side, and each CPE 340 is considered a transmitting side.

The DPU 302 comprises a processor 310, a memory device 320, and a plurality of—transceivers 330 configured as shown in FIG. 3 (there may be N transceivers, where N is an integer greater than one). On the other hand, each CPE 340 also comprises a processor 310, a memory device 320, and a transceiver 342. In the G.fast standard, each of the transceivers 330 may be an FTU-O, and each of the transceivers 342 may be an FTU-R. A processor 310 may be implemented as one or more central processing unit (CPU) chips, cores (e.g., a multi-core processor), field-programmable gate arrays (FPGAs), application specific integrated circuits (ASICs), and/or digital signal processors (DSPs). The processor 310 may be implemented using hardware or a combination of hardware and software.

A memory device 320 may comprise a cache, random access memory (RAM), read only memory (ROM), secondary storage, or any combination thereof. Secondary storage typically comprises one or more disk drives or tape drives and is used for non-volatile storage of data and as an over-flow data storage device if RAM is not large enough to hold all working data. Secondary storage may be used to store programs that are loaded into RAM when such programs are selected for execution. ROM may be used to store instructions and perhaps data that are read during program execution. ROM is a non-volatile memory device that typically has a small memory capacity relative to the larger memory capacity of secondary storage. RAM may be used to store volatile data and perhaps to store instructions. Access to both ROM and RAM is typically faster than to secondary storage.

The transceivers 330 may be configured to perform DMT modulation and demodulation. The transceivers 330 may serve as input and/or output devices of the DPU 302. For example, if a transceiver 330 is acting as a transmitter, it may transmit data out of the DPU 302. If a transceiver 330 is acting as a receiver, it may receive data into the DPU 302. The DPU 302 may be configured to perform any of the schemes discussed herein, such as transmission of an OPS prepended or appended with a 0-element. On the other hand, each CPE 340 may achieve self-synchronization by receiving an OPS prepended or appended with a Z-state as described herein.

It is understood that by programming and/or loading executable instructions onto the xTU-O or the CPE 340, at least one of the processor 310 and the memory 320 are changed, transforming the xTU-O in part into a particular machine or apparatus (e.g., a xTU-O configured to transmit OPS with an appended or prepended 0-element). The executable instructions may be stored on the memory 320 and loaded into the processor 310 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Disclosed embodiments may enable an initializing FTU-R to self-synchronize its receiver to a downstream transmitter's OPS bit index prior to FEQ training. Consequently, the self-synchronization may enable fast CDMA-like FEQ training, even under the presence of strong FEXT. Further, the self-synchronization may also enable an initializing FTU-R transmitter to synchronize to an upstream OPS bit index.

FEQ training may utilize similar concept as in CDMA used in wireless communication. A simplified mathematical model can be written into formula:

$$Y = HX + Z \tag{1}$$

where H represents a channel matrix that includes a direct channel and one or more FEXT channels, X is a matrix representing a plurality of transmitted signals which are orthogonal or pseudo orthogonal signals at the sync symbol. Z is a matrix representing noises, such as an additive white Gaussian noise (AWGN) (note that the same principles apply to any other noise pattern), and Y is a matrix representing a plurality of received signals.

To compute H, both sides of formula (I) can be multiplied by the inverse of X as shown below:

$$\frac{Y \cdot X^H}{c} = H + \frac{Z \cdot X^H}{c} \tag{2}$$

where $X^H$ represents a conjugate of X, and C represents a determinant of X.

The channel matrix H may comprise N×N elements (N denotes a number of subscriber lines in a vectored group), and an element $h_{ii}$ therein represents a direct channel with row index i and column index i. FEQ coefficients may be computed as the inverse of the direct channel $h_{ii}$ in the matrix H. To compute $h_{ii}$, we rewrite the above matrix equation along the diagonal elements to get formula:

$$\frac{\sum_{k=1}^{m} y_{ik} \cdot \bar{x}_{ik}}{c} = h_{ii} + \frac{\sum_{k=1}^{m} z_{ik} \cdot \bar{x}_{ik}}{c}, \quad i = 1, 2, \ldots, N \tag{3}$$

where k represents a tone index from 1 to m, $y_{ik}$ represents an element at row i and column k of matrix Y, and $\bar{x}_{ik}$ represents an element at row i and column k of the matrix $X^H$.

$\bar{x}_{ik}$ may be considered the inverse of a transmitted signal, and $\bar{x}_{ik}$ may be used as a reference signal at the receiver end. $\bar{x}_{ik}$ is made of several parts as shown in formula (with subscripts now omitted):

$$\bar{x} = \text{conjugate}(\text{OPS} * \text{PRBS} * (1+1j)) \tag{4}$$

A pseudo-random binary sequence (PRBS) generator may generate a random or pseudo-random value, e.g., across the spectrum or tones. The PRBS may be reset at the beginning of each DMT symbol, and the PRBS may be known by the receiver side. PRBS may indicate that a quadrant scrambler rotates the constellation of each tone from an original point, e.g., having value "1+j" or "1−j", based on two-bits of the PRBS.

In formula (4), the content of PRBS may be a fixed value and known to the remote receiver side, which is the case in G.993.5. In other applicable DSL systems such as G.fast, the content of PRBS may be communicated to the receiver side (e.g., an FTU-R in DS case) in a handshake stage. Further, in G.fast distinct scramblers may be used for different FTU-R's. Also, the PRBS generator may be the same for each FTU-R, but the reset state may be different for each FTU-R. The reset state may be communicated to each FTU-R in the handshake stage.

In the CDMA-like approach of training an FEQ, in order to extract a direct channel, the receiving side such as an FTU-R may need the exact bit index or time marker of the OPS with respect to a currently received signal. Once the bit index or time marker is determined, the receiving side may perform proper correlation with its own reference probe sequence to derive the direct channel from the received signal or signals and reject the FEXT channels. This is possible because the probe sequence transmitted to each receiver is orthogonal to the probe sequence transmitted to other receivers. After the extraction of the direct channel, the receiving side may invert the direct channel to derive FEQ coefficients, thereby completing FEQ training.

Embodiments disclosed herein may enable the receiving side to detect a zero level (Z)-state marked by one or more 0-elements. The Z-state may allow the receiving side to synchronize to a pilot sequence of a transmitting side prior to FEQ training. In other words, similar to CDMA-like FEQ training, disclosed embodiments may find or determine a symbol or time position or bit index of an OPS. The first or last sync symbol of the OPS is used as a marker. The marker may comprise one or more quiet symbols. This quiet symbol may not be included in the total length of the OPS. For example, an OPS of length 16 is used, the actual period of the OPS is 17.

FIG. 4A illustrates an example of a traditional OPS 400 used by existing xDSL systems. Here we assume the OPS 400 takes the form of a 4×4 matrix corresponding to four ports for a vectored group of four FTU-R's. Although it should be understood that an OPS disclosed herein may have any suitable number of rows and columns. Note that the traditional OPS 400 consist of +1 and −1 elements only with no 0-element. The OPS 400 is a Hadamard matrix (denoted as W), wherein each row is orthogonal with respect to other rows; i.e., the inner product of each row by another row is zero. While the term OPS is primarily used herein, one of ordinary skill in the art will recognize that the same principles applies to a pseudo-orthogonal probe sequence or a more general probe sequence.

In the OPS 400 (or any other OPS disclosed herein), each row may be used for a port and each element, or bit in this case, may modulate a sync symbol. Each column indicates transmission of sync symbols over different ports at a given time. A "+1" bit keeps constellation points unchanged and a −1 negates both real and imaginary parts of constellation points for all tones, or vice versa. In other words, a "+1" bit may negate both real and imaginary parts of constellation points, while a "−1" bit may keep constellation points unchanged. The OPS 400 may be periodically transmitted over sync symbols. Therefore, as shown in FIG. 4B, the OPS matrix 400 may be observed as repeating to the right as time progresses, forming a plurality of OPS matrices 420 over time. It should be noted that while a probe sequence element may be considered as modulating a DMT symbol with fixed constellation points on each subcarrier where each subcarrier of the DMT symbol has been rotated by a scrambler output value, a probe sequence element may be equivalently considered as a constellation point mapping. For example, a −1 element may be mapped to constellation point 1+j, a +1 element may be mapped to constellation point −1−j, and a 0-element may be mapped to constellation point 0+0j (in other words, represented by a masked subcarrier or by a subcarrier with a gain of zero) on all subcarriers. Then the scrambler may operate across the subcarriers to randomize the constellations. These two approaches are equivalent, and DSL standards may adopt either approach (e.g., G.fast may adopt the second approach).

In contrast to the traditional OPS 400 shown in FIG. 4A, FIG. 4C illustrates an example of a disclosed OPS 440, which is the same with the OPS 400 except that an additional 0-element column is added to the beginning to indicate a start of the OPS 440. In implementation, the 0-element column indicates that all ports for all FTU-R's may transmit no signal or zero-amplitude signals (caused by the 0-element) at the same time or symbol position. The zero-amplitude across the vectored group of subscriber lines may be detected by a receiving side without FEQ. Once the receiving side detects a 0-element, the receiving side may synchronize to a time period such that the 0-element marks a start or an end of a reference probe sequence. The receiving side has known the content of the reference probe sequence, which may have been stored in the receiving side beforehand or have been sent from the transmitting side to the receiving side during an earlier phase of initialization such as in handshake phase. Accordingly, the receiving side may synchronize with the transmitting side based on the 0-element.

One or more 0-elements may be appended not only to the beginning (i.e., first column) of an OPS, but also to any other suitable column. FIG. 4D illustrates another example of a disclosed OPS 460, which comprises a 0-element in the last column to indicate an end of the OPS 460. The additional 0-element may be incorporated into every OPS period (covering multiple DMT symbol durations). Therefore, as shown in FIG. 4E, the OPS matrix 440 or 460 may be observed as repeating to the right as time progresses, forming a plurality of OPS matrices 480 over time. Note that, over the duration of N OPS periods, the net effect of the OPS 440 and the OPS 460 may be the same, since the same OPS matrices 480 can be formed.

Instead of appending a 0-element to each OPS matrix W, in an alternative embodiment as shown in FIG. 4F, the 0-element maybe inserted every N (any integer greater than one) period of the original W matrix. The use of N>1 may reduce unnecessary overhead due to the 0-element. As the 0-element may be used to help an initializing line to synchronize its receiver or transmitter to the bit-index of the DS OPS or US OPS, respectively, sometimes it may be unnecessary to transmit the 0-element in every OPS period.

During normal mode of operation, an OPS may be used to dynamically record and update FEXT channel changes of the active lines. Having overly frequent 0-element (Z-state) transmission may disturb the active lines by delaying their FEXT channel update and therefore FEXT precoder and canceller update. To minimize this potential drawback and further reduce overhead caused by the 0-element, in an embodiment, the 0-element may be activated (appended to an OPS) by a vector control engine (VCE) when a new line initializes or joins a vectored group of active lines.

Although much of this disclosure discusses the DS direction, similar principles may also be applied to the US direction. As the downstream direction may use a first OPS, and the upstream direction may use a second OPS, it should be noted that the first OPS and the second OPS may or may not be the same. Further, the lengths of the first OPS and the second OPS may or may not be equal. However, synchronization may be facilitated if one is a multiple integer of the other.

In an embodiment, when the second OPS has the same period (or the same number of bits in each row) as the first OPS, their transmission may be synchronized. Specifically, the first OPS and the second OPS may start at the same time or bit index. Thus, knowing a start time of the first OPS may lead to knowledge of a start time of the second OPS. In this way, US OPS may be synchronized among the vectored group of subscriber lines.

If a Z-state (0-element) is used for every N OPS periods, the N value may or may not be the same for the DS and US directions. For example, a Z-state may be inserted every 10 OPS periods in the DS direction, but may be inserted every 20 or any other number of OPS periods in the US direction.

For example, when using N OPS periods to make an US OPS and a DS OPS start at the same time or with a known offset time, we can assume that the length of the US OPS and the DS OPS are different. In this case, a minimal N value is the smallest common multiple of the US OPS length and DS OPS length, divide by a value that is the greatest common divisor of the US OPS length and the DS OPS length.

From the implementation point of view, a 0-element in the OPS indicates that a constellation point (e.g., "1+j" or any other complex number, where j=sqrt(−1)), is multiplied by 0. In this case, any signal mapped to the constellation point is killed or caused to have a zero-amplitude. When a 0-element is transmitted over sync symbols on the vectored group of subscriber lines, there may be no signal or FEXT among the vectored group of subscriber lines. Accordingly, the bit index or time position of the 0-element may be detected by an initializing FTU-R prior to FEQ training. After detecting the 0-element, the FTU-R may determine the start or end of the OPS, and synchronize itself to the bit index of the OPS.

In a DSL system (e.g., the system 300), the same OPS matrix may be used on a plurality of tones used in the DSL system, thus discussion on one of the tones may apply to other tones as well. Further, the same OPS matrix may be shared by all receivers. Thus, if a receiver is only interested in its direct channel, the receiver may only need to get its corresponding row (probe sequence) of the OPS matrix. This row may be referred to as a reference probe sequence or a set of probe sequence bits (elements). In the receiver, by correlating the reference probe sequence by the received symbols over the length of the row, the direct channel remains while other rows may be eliminated in the correlation operation, since the other rows are orthogonal or do not correlate with the direct channel row. Therefore, any FEXT present may be eliminated (or killed). Alternatively, if a receiver with index "i" is interested in FEXT from a transmitter with index "j", the receiver "i" may need to correlate its received signal with row "j" of the OPS matrix. In this case, the direct channel and FEXT from other channels except row "j" may be killed in the correlation process, and only the FEXT from channel "j" may remain. However, in this case the receiver "i" needs to know row "j" content of the OPS matrix.

FIG. 5A is a schematic diagram illustrating a symbol modulation pattern 500 used by G.993.5 for upstream OPS synchronization, while FIG. 5B is a schematic diagram illustrating an embodiment of a symbol modulation pattern 540. FIG. 5A is also listed as FIG. 10-6 in G.993.5 Section 10.3.3.5, thus implementation details regarding the symbol modulation pattern 500 can be found there (not repeated here in the interest of conciseness). The pattern 500 in FIG. 5A contains two symbol states denoted as 1 and 0. According to G.993.5, using the pattern 500 may require a FEQ to be trained and functioning beforehand. Further, the synchronization may be relatively complex to implement and may not be robust under strong FEXT.

On the other hand, the pattern 540 in FIG. 5B shows a repeating 8-element probe sequence "+1 −1 +1 +1 −1 −1 +1 −1" of a port with a 0-element added at the beginning, thus the pattern 540 comprises three symbol states denoted as 0, +1, and −1. Comparing the symbol modulation pattern 500 used by G.993.5 to the symbol modulation pattern 540 disclosed herein, one of ordinary skill will recognize that the pattern 540 comprises an additional Z-state or 0-element, which is not present in the pattern 500.

The G.fast standard has agreed that "G.fast shall specify channel estimation probe signals that, besides elements of probe sequences with values 1 and −1, also provide an 0-element with 0 value, where 0-element stands for no transmission power, e.g., masked probe tone(s) or masked symbol(s)."

It should be understood that the 0, +1, and −1 states in the pattern 540 are three distinct elements and may require two bits to represent each element, thus they are different from traditional +1 and −1 only states that require only one bit to represent. For example, the elements of the probe sequence may be represented by two bits as: 00 for 0-element, 01 for +1 element and 10 for −1 element; while in the traditional method a single bit is enough to represent the two distinct elements of +1 and −1. In practice, when an OPS element is multiplied by a DMT symbol, if the OPS element is +1, the DMT symbol stays intact; if the OPS element is −1, the DMT symbol is negated or rotated by 180 degrees in phase (alternatively, the DMT symbol can stay intact if the OPS element is −1 and be negated in phase if the OPS element is +1); otherwise, if the OPS element is 0, the DMT symbol is killed (i.e., caused to have zero-amplitude). The zero-amplitude signal (or no signal at all) leads to zero FEXT among the vectored group of lines, which can be detected by a receiving side without relying on FEQ using power level detector or other methods. As a result, compared with G.993.5 synchronization method to upstream OPS that required prior FEQ, synchronization to downstream OPS using a disclosed method that does not require FEQ may be relatively simpler to implement and may be more robust under strong FEXT.

According to an embodiment, in a channel discovery stage denoted as CHANNEL DISCOVERY 1-1 stage, FTU-O's may transmit sync symbols modulated by an OPS. The OPS may start from one or more 0-elements or end with one or more 0-elements, and may be determined by the G.994.1 standard for every line, based on capability reported from the FTU-R of a joining line. The OPS may not contain 0-elements anywhere else except the first or the last column of the OPS. Distinct scrambling seed per line may be applied on data symbols and may be the same as used on sync symbols. Note that this OPS may be different from the one used in a signal referred to in G.fast as O-P-VECTOR 1. The duration of the channel discovery stage may be determined by the FTU-O according to G.994.1 based on one or more requests (e.g., synchronization requests) from the FTU-R's of joining lines.

Whether an FTU-R supports the use of a special probe sequence disclosed herein may be indicated by a capabilities list request (CLR) message sent from the FTU-R to the FTU-O in G.994.1 handshake stage. In an embodiment, the CLR message contains a standard information field denoted as Npar(2) bit corresponding to the G.fast SPar(1) bit, wherein the Npar(2) bit may be set to zero to indicate that the FTU-R does not support the use of a special probe sequence to be used, e.g., during Channel Discovery 1-1 and Channel Discovery 1 stages. Otherwise, the Npar(2) bit may be set to ONE to indicate that the FTU-R supports the use of a probe sequence with one or more 0-elements marking a start of the probe sequence.

Disclosed embodiments may use a 0-element in every OPS period or every N OPS periods to indicate the start of the OPS bit index. Therefore, there is no need to transmit the time marker of DS OPS bit index beforehand from an FTU-O to an FTU-R. In synchronous time division duplexing (TDD) used by G.fast, an US OPS and a DS OPS may start at the same time or with a known offset time. Therefore, there may be no need to further communicate the US OPS time marker from the FTU-O to the FTU-R. Because the active and joining lines' FTU-O's may transmit the 0-element, there may not be any signal (including direct channel signal or FEXT) on the line. Therefore, detection of this time period may be readily achieved without a need for FEQ.

To demonstrate performance improvement of the disclosed embodiments over traditional methods, a series of simulations were conducted. FIGS. 6A-6D are diagrams illustrating simulation results obtained by training FEQ using a least mean square (LMS) algorithm when FEXT is present, while FIGS. 7A-7D are diagrams illustrating simulation results obtained by training FEQ using a disclosed CDMA-like algorithm that is possible using the disclosed embodiment that eliminates FEXT in FEQ training. Other setups are the same, and a relatively strong FEXT environment is assumed. FIGS. 6A-6D reveal that a strong FEXT reduces the accuracy of FEQ coefficient using traditional LMS algorithm.

Noticeable performance improvement can be seen by comparing FIGS. 6A-6D to FIGS. 7A-7D, respectively. For example, as frequency increases (note that the horizontal axis in all simulation results indicates tone index of DMT) to near 4000, the magnitude of FEQ in FIG. 6A experienced a sudden rise (a sign of instability), while the magnitude of FEQ in FIG. 7A shows a much smoother rise. Also, FIG. 6C shows a multiplication of a direct channel function and a FEQ (ideally should be one since the FEQ is the inverse of the direct channel) that deviates from one, while FIG. 7C shows the multiplication staying around one in spite of frequency increase.

Figure 8:
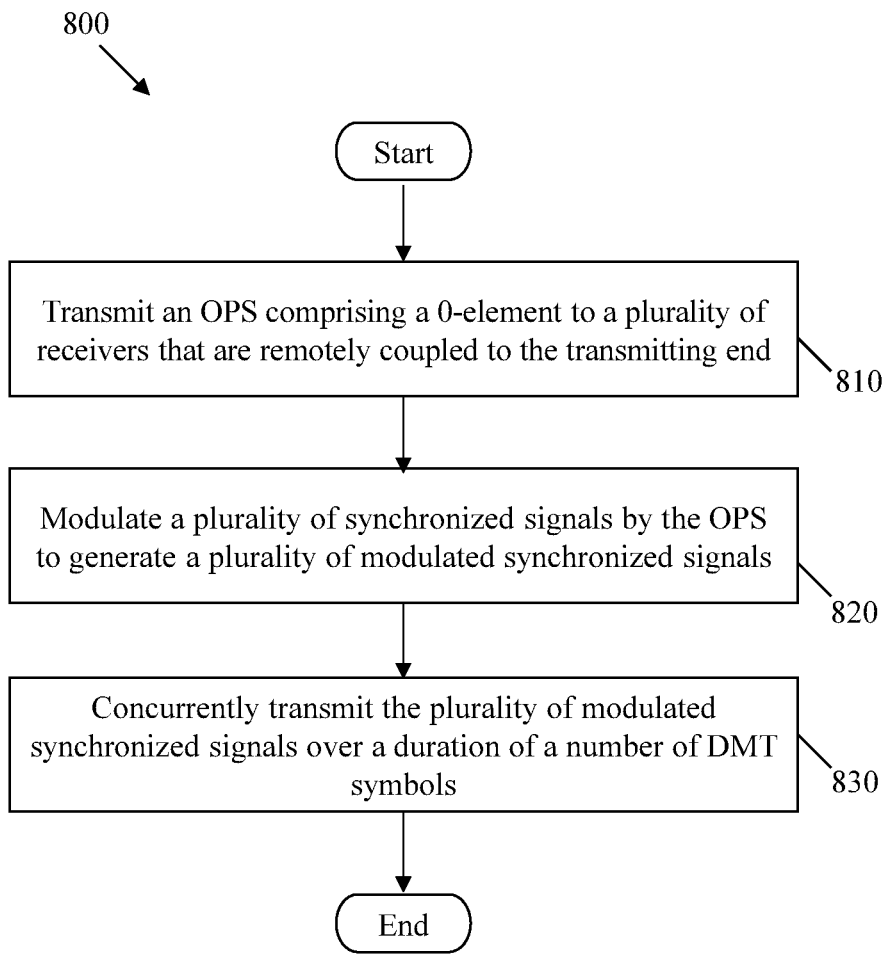
FIG. 8 is a flowchart of an exemplary embodiment of an OPS communication method.

FIG. 8 is a flowchart of an embodiment of a method 800, which may be implemented in a DSL system, e.g., the DSL system 300 or any DSL system including the downstream section 100 and the upstream section 200. The method 800 starts in step 810, in which one or more transmitter in a transmitting end (e.g., the DPU 302) may transmit an OPS to a plurality of receivers that are remotely coupled to the transmitting end via a vectored group of subscriber lines. In alternative embodiments, step 810 may be skipped if the OPS is manually stored into the receivers.

The OPS comprises a column of 0-elements that indicates a start or an end of the OPS. In an embodiment, the 0-element column is a first column or a last column of the OPS (but not both columns) consisting of 0-elements, wherein the first column containing only zero-values or 0-elements indicates the start of the OPS, wherein the last column containing only 0-element indicates the end of the OPS. Further, the OPS may contain no zero-values in any other column except the first column or the last column. For example, the OPS may consist of plus one (+1) bits and minus one (−1) bits located in other columns except the 0-element column. Depending on the implementation, each receiver may receive the whole OPS or a corresponding row of the OPS.

In step 820, the transmitting end may modulate a plurality of synchronized signals by the OPS to generate a plurality of modulated synchronized signals. Modulation may be performed in any suitable manner. During the modulation, each DMT symbol may be multiplied by one of the +1 element, −1 element, and 0-element that corresponds to the DMT symbol, wherein a +1 element leaves the DMT symbol intact during modulation, a −1 element reverses the phase of the DMT symbol, and a 0-element renders the DMT symbol to have zero-amplitude (alternatively, the DMT symbol can stay intact if the OPS element is −1 and be negated in phase if the OPS element is +1).

In step 830, the transmitting end may concurrently transmit the plurality of modulated synchronized signals over a duration of a number of DMT symbols, wherein each of the plurality of modulated synchronized signals is intended for one of the plurality of receivers. The 0-element may cause all of the plurality of modulated synchronized signals to have a zero-amplitude during a first or a last of the DMT symbols. Further, the zero-amplitude of the plurality of synchronizing signals may lead to zero far end signal and zero FEXT among the vectored group of subscriber lines in the first or the last of the DMT symbols.

In the DS direction, each of the plurality of the transmitters may be an FTU-O collocated in a DPU, and each of the plurality of receivers may reside in a CPE, which is configured to receive a modulated synchronized signal, detect the zero-amplitude of the modulated synchronized signal during a DMT symbol, mark the DMT symbol as a start of a reference probe sequence known by the CPE, and extract a direct channel function from the modulated synchronized signal based on the reference probe sequence.

One of ordinary skill in the art will recognize that the method 800 includes only a portion of necessary steps in communication between the transmitting end and receiving end, thus further steps may be incorporated however suitable, or steps may be modified depending on the application. For example, in the US direction, the method 800 may further receive, from a receiving end of a joining line, a synchronization request prior to modulating the plurality of synchronized signals, wherein using 0-element when modulating the plurality of synchronized signals by the OPS is based on capability reported by the receiving end of the joining line during a handshake phase between one of the transmitters and the receiving end of the joining line.

For another example, in case of one 0-element per N OPS periods, the OPS used in step 820 may be the first one of a plurality of OPS matrices, wherein the rest of the plurality of OPS matrices are identical with the first OPS except that none of the rest of the plurality of OPS matrices contains the 0-element. More synchronized signals may be modulated by the rest of the plurality of OPS matrices to generate more modulated synchronized signals, which may then be concurrently transmitted over a duration of more DMT symbols targeting the plurality of receivers. After entering normal operation stage, additional synchronized signals may no longer need to be modulated by 0-element, to minimize overhead.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method comprising:
modulating a plurality of synchronization signals (sync symbols) by a probe sequence (PS) to generate a plurality of modulated synchronization signals for a plurality of subscriber lines, wherein the PS comprises one or more zero element (0-element) columns that indicate a start or an end of the PS, and wherein a zero element (0-element) column is used to simultaneously modulate the plurality of synchronization signals by a zero element (0-element) for each corresponding subscriber line to indicate the start or the end of the modulated synchronization signal; and
concurrently transmitting, using one or more transmitters, the plurality of modulated synchronization signals over the plurality of subscriber lines over a duration of a number of discrete multi-tone (DMT) symbols, wherein each of the plurality of modulated synchronization signals is intended for one of a plurality of receivers that are remotely coupled to the one or more transmitters via a vectored group of subscriber lines, and wherein the one or more 0-element columns cause all of the plurality of modulated synchronization signals to have a zero-amplitude during one or more corresponding DMT symbols,
wherein the one or more 0-element columns are first columns or last columns of the PS, wherein the first columns containing only 0-elements indicate the start of the PS, wherein the last columns containing only 0-elements indicate the end of the PS, wherein the PS contains no 0-element in any other column except the first columns or the last columns,
wherein the one or more 0-element columns comprise 0-elements, wherein the PS further comprises plus one (+1) elements and minus one (−1) elements located in other columns except the 0-element columns, wherein during the modulation of the sync symbols, each DMT symbol is multiplied by one of the +1 elements, the −1 elements' and the 0-elements that corresponds to the DMT symbol wherein either multiplication by the +1 element leaves the DMT symbol intact and multiplication by the −1 element reverses a phase of the DMT symbol during the modulation, or multiplication by the −1 element leaves the DMT symbol intact and multiplication by the +1 element reverses a phase of the DMT symbol during the modulation, and wherein multiplication by the 0-element, renders the DMT symbol to have the zero-amplitude.

2. The method of claim 1, wherein the +1 elements, −1 elements, and 0-elements are represented by two-bit constellations, wherein the −1 element is mapped to constellation point 1+j, the +1 element is mapped to constellation point −1−j, and the 0-element is mapped to constellation point 0+0j.

3. The method of claim 1, further comprising transmitting the PS to the plurality of receivers prior to modulating the plurality of synchronization signals by the PS.

4. The method of claim 1, wherein the one or more transmitters reside in a distribution point unit (DPU), wherein the plurality of modulated synchronization signals are transmitted onto the vectored group of subscriber lines in a downstream direction, and wherein each of the plurality of receivers resides in a customer premise equipment (CPE) which is configured to receive a modulated synchronization signal, detect the zero-amplitude of the modulated synchronization signal during a DMT symbol, mark the DMT symbol as a start of a reference probe sequence known by the CPE, and extract a direct channel function from the modulated synchronization signal based on the reference probe sequence.

5. The method of claim 1, wherein the one or more 0-element columns are first columns of the PS, wherein the PS is the first one of a plurality of PS matrices, wherein the rest of the plurality of PS matrices are identical with the first PS except that none of the rest of the plurality of PS matrices contains any 0-element column, and wherein more synchronization signals are modulated by the rest of the plurality of PS matrices to generate more modulated synchronization signals, which are then concurrently transmitted over a duration of more DMT symbols targeting the plurality of receivers.

6. The method of claim 1, further comprising receiving, from a receiving end of a joining line, a synchronization request prior to modulating the plurality of synchronization signals, wherein modulating the plurality of synchronization signals by the PS is based on capability reported by the receiving end of the joining line during a handshake phase between one of the transmitters and the receiving end of the joining line.

7. An apparatus comprising:
one or more processors configured to modulate a plurality of synchronization signals using a special probe sequence (PS) to generate a plurality of modulated synchronization signals for a plurality of subscriber lines, wherein each of the plurality of modulated synchronization signals comprises a number of discrete multi-tone (DMT) symbols; and
one or more transmitters coupled to the one or more processors and configured to concurrently transmit the plurality of modulated synchronization signals over the plurality of subscriber lines over a number of time periods corresponding to the DMT symbols,
wherein each of the plurality of modulated synchronization signals is intended for one of a plurality of receivers that are remotely coupled to the one or more transmitters via a vectored group of subscriber lines, and
wherein all of the plurality of modulated synchronization signals have a zero-amplitude in one or more first time periods or one or more last time periods,
wherein the special PS is represented by a matrix with a plurality of rows and a plurality of columns, wherein one or more first columns or last columns in tire plurality of columns are zero element (0-element) columns containing only zero-values which cause the zero-amplitude,
wherein the matrix representing the special PS consists of plus one (+1) values and minus one (−1) values in other columns except the 0-element columns, wherein during the modulation of the sync symbols, each DMT symbol is multiplied by one of the +1 value, the −1 value, and the zero-value that corresponds to the DMT symbol, wherein either multiplication by the +1 value leaves the DMT symbol intact and multiplication by the −1 value reverses a phase of the DMT symbol during the modulation, or multiplication by the −1 value leaves the DMT symbol intact and multiplication by the +1 value reverses a phase of the DMT symbol during the modulation, and wherein multiplication by the zero-value renders the DMT symbol to have the zero-amplitude.

8. The apparatus of claim 7, wherein each of the one or more transmitters is further configured to transmit a corresponding row of the special PS to its corresponding receiver prior to transmitting one of the plurality of modulated synchronization signals.

9. The apparatus of claim 7, wherein at least some of the plurality of synchronization signals have non-zero-amplitudes in other time periods except the first or last time periods.

10. The apparatus of claim 9, wherein the plurality of modulated synchronization signals are transmitted onto the vectored group of subscriber lines in a downstream direction, wherein each of the one or more transmitters is part of a G.fast transceiver unit at an operator side (FTU-O), and wherein each of the plurality of receivers is part of a G.fast transceiver unit at a remote terminal (FTU-R).

11. The apparatus of claim 9, wherein the one or more 0-element columns are first columns of the matrix, which is a first matrix of a plurality of PS matrices, wherein the rest of the plurality of PS matrices are identical with the first matrix except that none of the rest of the plurality of PS matrices contains any 0-element column, wherein the one or more processors are further configured to modulate additional synchronization signals by the rest of the plurality of PS matrices to generate additional modulated synchronization signals, and wherein the one or more transmitters are further configured to concurrently transmit the additional modulated synchronization signals over additional DMT symbols targeting the plurality of receivers.

12. The apparatus of claim 9, further comprising one or more receivers coupled to the one or more processors and configured to receive, from a transmitter located in a receiving end of a joining line, a synchronization request, wherein modulating the plurality of synchronization signals by the special PS is based on capability reported by the receiving end during a handshake phase between the apparatus and the receiving end.

13. An apparatus comprising:
a receiver configured to receive, from a subscriber line, a signal over a plurality of time periods from a transmitter, wherein each of the plurality of time periods corresponds to a duration of a discrete multi-tone (DMT) symbol, wherein each DMT symbol is either a data symbol or a synchronization symbol, wherein each synchronization DMT symbol has been modulated by an element of a probe sequence, wherein the probe sequence is orthogonal to other probe sequences of other transmitters in a plurality of synchronized transmitters; and
a processor coupled to the receiver and configured to:
detect one or more time periods in which the received signal has a zero-amplitude in all signal channels; and
synchronize one or more zero elements (0-elements) to the time period such that the one or more 0-elements mark a start of a reference probe sequence, known by the processor,
wherein the probe sequence is represented by a matrix with a plurality of rows and a plurality of columns, wherein one or more first columns or last columns in the plurality of columns are zero element (0-element) columns containing only zero-values which cause the zero-amplitude,
wherein the matrix representing the probe sequence consists of plus one (+1) values and minus one (−1) values in other columns except the 0-element columns, wherein each synchronization DMT symbol modulated by the element of the probe sequence comprises each DMT symbol multiplied by one of the +1 value, the −1 value, and the zero-value that corresponds to the DMT symbol, wherein either multiplication by the +1 value leaves the DMT symbol intact and multiplication by the −1 value reverses a phase of the DMT symbol during the modulation, or multiplication by the −1 value leaves the DMT symbol intact and multiplication by the +1 value reverses a phase of the DMT symbol during the modulation, and wherein multiplication by the zero-value renders the DMT symbol to have the zero-amplitude.

14. The apparatus of claim 13, wherein the receiver is further configured to receive the reference probe sequence prior to receiving the signal, and wherein the reference probe sequence is used in extracting a direct channel from the received signal, the apparatus further comprising a memory coupled to the receiver and configured to store the reference probe sequence.

15. The apparatus of claim 14, wherein the reference probe sequence consists of plus one (+1) values and minus one (−1) values except the 0-elements, wherein the receiver is further configured to receive a pseudo-random binary sequence (PRBS) corresponding to the received signal, and wherein extracting the direct channel is further based on the PRBS.

16. The apparatus of claim 13, wherein the received signal comprises a component corresponding to a direct channel and one or more components corresponding to one or more far end crosstalk (FEXT) channels, and wherein all signal channels including the direct channel and the FEXT channels have the zero-amplitude in the one or more detected time periods.

17. The apparatus of claim 13, wherein the processor is further configured to compute one or more frequency domain equalizer (FEQ) coefficients based on a direct channel.

18. The apparatus of claim 13, wherein the transmitter that transmitted the signal downstream is located in a G.fast transceiver unit at an operator side (FTU-O), wherein the receiver and the processor are parts of a G.fast transceiver unit at a remote terminal (FTU-R), and wherein the FTU-R is connected to the FTU-0 through a subscriber line.

19. The apparatus of claim 18, wherein the processor is further configured to modulate a synchronization signal using the reference probe sequence to generate a modulated synchronization signal, wherein the apparatus further comprises a second transmitter coupled to the processor and configured to transmit the modulated synchronization signal upstream targeting the FTU-O, and wherein transmitting the modulated synchronization signal is performed synchronously with other FTU-R transmitters, with a known offset from a downstream probe sequence bit index, to indicate the start of an upstream probe sequence bit index.

20. The apparatus of claim 18, further comprising a second transmitter configured to transmit a capabilities list request (CLR) message to the FTU-O in a handshake stage prior to the receiver receiving the signal, and wherein the CLR message comprises an information bit, denotable as NPar(2) field bit corresponding to a SPar(1) bit, indicating that the FTU-R supports use of a special probe sequence with one or more 0-elements at the start of the special probe sequence.

21. The method of claim 1, wherein the zero-amplitude of the plurality of synchronization signals leads to zero-amplitude far end signals and zero-amplitude far end crosstalk (FEXT) at the receivers of the vectored group of subscriber lines in the one or more corresponding DMT symbols,
wherein a received signal at each of the receivers comprises a noise component when the far end signal and the far end crosstalk have the zero-amplitude in the one or more corresponding DMT symbols, and
wherein one or more of the receivers measure the corresponding noise components during the one or more corresponding DMT symbols.

22. The method of claim 1, wherein the probe sequence comprises a periodic probe sequence.

23. The apparatus of claim 7, wherein the probe sequence comprises a periodic probe sequence.

24. The apparatus of claim 13, wherein the probe sequence comprises a periodic probe sequence.

* * * * *

UNITED STATES PATENT AND TRADEMARK OFFICE
CERTIFICATE OF CORRECTION

PATENT NO. : 9,614,660 B2
APPLICATION NO. : 14/132207
DATED : April 4, 2017
INVENTOR(S) : Jianhua Liu and Amir H. Fazlollahi It is certified that error appears in the above-identified patent and that said Letters Patent is hereby corrected as shown below:

In the Claims

Column 15, Lines 61-67, through Column 16, Lines 1-40, Claim 1 should read:
1. A method comprising:
    modulating a plurality of synchronization signals (sync symbols) by a probe sequence (PS) to generate a plurality of modulated synchronization signals for a plurality of subscriber lines, wherein the PS comprises one or more zero element (0-element) columns that indicate a start or an end of the PS, and wherein a zero element (0-element) column is used to simultaneously modulate the plurality of synchronization signals by a zero element (0-element) for each corresponding subscriber line to indicate the start or the end of the modulated synchronization signal; and
    concurrently transmitting, using one or more transmitters, the plurality of modulated synchronization signals over the plurality of subscriber lines over a duration of a number of discrete multi-tone (DMT) symbols, wherein each of the plurality of modulated synchronization signals is intended for one of a plurality of receivers that are remotely coupled to the one or more transmitters via a vectored group of subscriber lines, and wherein the one or more 0-element columns cause all of the plurality of modulated synchronization signals to have a zero-amplitude during one or more corresponding DMT symbols,
    wherein the one or more 0-element columns are first columns or last columns of the PS, wherein the first columns containing only 0-elements indicate the start of the PS, wherein the last columns containing only 0-elements indicate the end of the PS, wherein the PS contains no 0-element in any other column except the first columns or the last columns,
    wherein the one or more element columns comprise 0-elements, wherein the PS further comprises plus one (+1) elements and minus one (-1) elements located in other columns except the 0-element columns, wherein during the modulation of the sync symbols, each DMT symbol is multiplied by one of the +1 elements, the -1 elements, and the 0-elements that corresponds to the DMT symbol, wherein either multiplication by the +1 element leaves the DMT symbol intact and multiplication by the -1 element reverses a phase of the DMT symbol during the modulation, or Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,614,660 B2 multiplication by the -1 element leaves the DMT symbol intact and multiplication by the +1 element reverses a phase of the DMT symbol during the modulation, and wherein multiplication by the 0-element renders the DMT symbol to have the zero-amplitude.

Column 17, Lines 15-55, Claim 7 should read:

7. An apparatus comprising:

one or more processors configured to modulate a plurality of synchronization signals using a special probe sequence (PS) to generate a plurality of modulated synchronization signals for a plurality of subscriber lines, wherein each of the plurality of modulated synchronization signals comprises a number of discrete multi-tone (DMT) symbols; and one or more transmitters coupled to the one or more processors and configured to concurrently transmit the plurality of modulated synchronization signals over the plurality of subscriber lines over a number of time periods corresponding to the DMT symbols, wherein each of the plurality of modulated synchronization signals is intended for one of a plurality of receivers that are remotely coupled to the one or more transmitters via a vectored group of subscriber lines, and wherein all of the plurality of modulated synchronization signals have a zero-amplitude in one or more first time periods or one or more last time periods, wherein the special PS is represented by a matrix with a plurality of rows and a plurality of columns, wherein one or more first columns or last columns in the plurality of columns are zero element (0-element) columns containing only zero-values which cause the zero-amplitude, wherein the matrix representing the special PS consists of plus one (+1) values and minus one (-1) values in other columns except the 0-element columns, wherein during the modulation of the sync symbols, each DMT symbol is multiplied by one of the +1 value, the -1 value, and the zero-value that corresponds to the DMT symbol, wherein either multiplication by the +1 value leaves the DMT symbol intact and multiplication by the -1 value reverses a phase of the DMT symbol during the modulation, or multiplication by the -1 value leaves the DMT symbol intact and multiplication by the +1 value reverses a phase of the DMT symbol during the modulation, and wherein multiplication by the zero-value renders the DMT symbol to have the zero-amplitude.